(12) United States Patent
Dettinger et al.

(10) Patent No.: US 8,176,039 B2
(45) Date of Patent: May 8, 2012

(54) ABSTRACT CLASSIFICATION FIELD SPECIFICATION

(75) Inventors: Richard D. Dettinger, Rochester, MN (US); Thomas J. Eggebraaten, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 12/036,086

(22) Filed: Feb. 22, 2008

(65) Prior Publication Data

US 2008/0147629 A1 Jun. 19, 2008

Related U.S. Application Data

(62) Division of application No. 10/860,414, filed on Jun. 3, 2004.

(51) Int. Cl.
*G06F 7/00* (2006.01)
*G06F 17/30* (2006.01)

(52) U.S. Cl. ........................................ 707/718; 707/760

(58) Field of Classification Search ........................ None
See application file for complete search history.

(56) References Cited

U.S. PATENT DOCUMENTS

| | | | |
|---|---|---|---|
| 5,734,887 A | 3/1998 | Kingberg et al. | |
| 6,553,368 B2 | 4/2003 | Martin et al. | |
| 6,578,046 B2 | 6/2003 | Chang et al. | |
| 6,725,227 B1 | 4/2004 | Li | |
| 6,757,670 B1 * | 6/2004 | Inohara et al. | 1/1 |
| 6,928,431 B2 | 8/2005 | Dettinger et al. | |
| 6,954,748 B2 | 10/2005 | Dettinger et al. | |
| 6,996,558 B2 | 2/2006 | Dettinger et al. | |
| 7,096,229 B2 | 8/2006 | Dettinger et al. | |
| 2002/0026443 A1 * | 2/2002 | Chang et al. | 707/10 |
| 2002/0078068 A1 | 6/2002 | Krishnaprasad et al. | |
| 2004/0103088 A1 | 5/2004 | Cragun et al. | |
| 2004/0205050 A1 | 10/2004 | Stevens et al. | |
| 2004/0243593 A1 | 12/2004 | Stolte et al. | |

OTHER PUBLICATIONS

Office Action for U.S. Appl. No. 10/860,414, dated Aug. 24, 2006.
Office Action for U.S. Appl. No. 10/860,414, dated Dec. 10, 2007.

* cited by examiner

*Primary Examiner* — Charles Rones
*Assistant Examiner* — Harold Hotelling
(74) *Attorney, Agent, or Firm* — Patterson & Sheridan LLP

(57) ABSTRACT

One embodiment includes receiving user input specifying a plurality of result fields for an abstract query. Each result field corresponds to a logical field specification of a data abstraction model abstractly describing the data in the database. The method further includes receiving user input selecting one of the plurality of result fields, and receiving user input specifying a classification definition for the selected result field. The classification definition is suitable for dividing data to be returned for the selected result field into a plurality of categories. Then, a classification field for the abstract query is generated on the basis of the selected result field and the classification definition. The classification field is included with the abstract query. The method further includes receiving a user request for execution of the abstract query against the database.

20 Claims, 12 Drawing Sheets

800

Data Discovery and Query Builder

[Save] [Save and Close] [Close] [Run]

910

[Define Conditions] [Modify Output]

ADD OUTPUT FIELDS:    OUTPUT SUMMARY:

PATIENTINFO
- ☒ PATIENT ID
- ☐ FIRST NAME
- ☐ MIDDLE INITIAL
- ☐ LAST NAME
- ☐ STREET
- ☐ CITY
- ☐ ZIP CODE
- ☐ PHONE NUMBER
- ☒ GENDER
- ☒ AGE
- ☐ RACE
- ⋮

| SELECT: | FIELD: | DATA TYPE: |
|---|---|---|
| ☐ | PATIENT ID | INT |
| ☐ | GENDER | CHAR |
| ☐ | AGE | INT |
| ☐ | GENDER CLASSIFICATION | CHAR |
| ☐ | AGE CLASSIFICATION | INT |

1238
1246
1232

[CLASSIFICATION]
[COLUMN ORDER]
[AGGREGATION]   ☐ USE AGGREGATE FORM OF QUERY
[SORTING]
[DATA FORMAT]   [DELETE]

*FIG. 12*

ABSTRACT CLASSIFICATION FIELD SPECIFICATION

CROSS-REFERENCE TO RELATED APPLICATIONS

This application is a divisional of co-pending U.S. patent application Ser. No. 10/860,414, filed Jun. 3, 2004, which is hereby incorporated by reference in its entirety.

BACKGROUND OF THE INVENTION

1. Field of the Invention

The present invention generally relates to data processing in databases and, more particularly, to constructing queries capable of returning classified information related to data in a database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

One function supported by query languages, including SQL, is the determination of classified information. Classified information is information related to a specific set of data being stored and managed by the DBMS which is grouped into a plurality of predefined categories. For instance, assume a user who wants to determine information related to the level of education of employees of a company. The education level (EDLEVEL) is expressed in an EMPLOYEE database table of the company as a number of years of education. Assume further that the user wants the education level to be classified according to different education categories, such as "secondary", "college" and "post graduate". Therefore, each number of years of education must be grouped into one of these education categories on the basis of conditions defining the categories. For each classified number of years of education, the corresponding education category can then be returned. More specifically, the user may issue the following SQL query against the database table EMPLOYEE:

```
SELECT EMPNO, FIRSTNAME, MIDINIT, LASTNAME,
   CASE
      WHEN EDLEVEL < 15 THEN 'SECONDARY'
      WHEN EDLEVEL < 19 THEN 'COLLEGE'
      ELSE 'POST GRADUATE'
   END
FROM EMPLOYEE
```

The SQL query includes a SELECT statement used to specify the fields to be returned, i.e., the result fields. In this example, the SELECT statement specifies a unique identification number (EMPNO), a first name (FIRSTNAME), a middle initial (MIDINIT) and a last name (LASTNAME). The SQL query further includes a FROM statement indicating that the query is executed against the EMPLOYEE table. Moreover, the SQL query includes a CASE expression for classifying all employees according to their number of years of education. More specifically, if a given employee has less than 15 years of education (EDLEVEL<15), the employee is classified as having a SECONDARY education level. If the given employee has at least 15 years and less than 19 years of education (EDLEVEL<19), the employee is classified as having a COLLEGE education level. If the given employee has at least 19 years of education, the employee is classified as having a POST GRADUATE education level.

However, SQL as a means for getting at classified information suffers in all the same ways that SQL suffers as a language for expressing queries. More specifically, one shortcoming of SQL as a means for getting at classified information is the reliance of SQL on user involvement. For instance, assume a user who executes an initial query against a database. In response to execution of the initial query, the user receives an initial query result showing detailed information related to one or more result fields specified by the initial query. Upon studying the initial query result, the user decides to obtain classified information related to data of one or more interesting result fields. To this end, the user needs to determine the interesting result fields from the initial query and to modify the query text to specify a corresponding CASE expression in the query. Assume further that subsequent to issuance of the modified query and return of the classified information, the user decides to obtain classified information related to data of one or more other interesting result fields of the initial query, or that the user wants to modify the classification of the second query, or to go back to the initial query result. Accordingly, the user would again be required to determine corresponding interesting result fields or all result fields from the initial query and to modify the query text to specify another desired CASE expression, to modify the existing CASE expression or to re-specify the initial query. In other words, for each subsequent query, modified or new query text needs to be provided by the user. Furthermore, for each modification of the query the user needs to retrieve the interesting result fields from the initial query. This is, however, cumbersome and inefficient for the user.

Therefore, there is a need for an improved and more flexible technique for handling queries in a database environment for obtaining classified information.

SUMMARY OF THE INVENTION

The present invention is generally directed to a method, system and article of manufacture for constructing queries that are executed against a database and, more particularly, for constructing queries capable of returning classified information related to data in a database.

One embodiment provides a method of constructing abstract classification fields. The method includes receiving user input specifying a logical field corresponding to a logical field specification of a data abstraction model. The data abstraction model abstractly describes data in a database. The logical field is associated with a specific set of the data. The method further includes receiving user input specifying a classification definition for the logical field. The classification definition is suitable for dividing the specific set of the data into a plurality of categories. Then, a classification field is generated on the basis of the logical field and the classification definition.

Another embodiment provides a method for constructing queries capable of returning classified information related to data in a database. The method includes receiving user input specifying a plurality of result fields for an abstract query. Each result field corresponds to a logical field specification of a data abstraction model abstractly describing the data in the database. The method further includes receiving user input selecting one of the plurality of result fields, and receiving user input specifying a classification definition for the selected result field. The classification definition is suitable for dividing data to be returned for the selected result field into a plurality of categories. Then, a classification field for the abstract query is generated on the basis of the selected result field and the classification definition. The classification field is included with the abstract query. The method further includes receiving a user request for execution of the abstract query against the database.

Still another embodiment provides a method for executing queries capable of returning classified information related to data in a database. The method includes receiving an abstract query. The abstract query includes (i) a plurality of result fields, and (ii) at least one classification field. Each of the plurality of result fields corresponds to a logical field specification of a data abstraction model abstractly describing the data in the database. The at least one classification field corresponds to a logical field of the data abstraction model being associated with a specific set of the data. Each classification field has a corresponding classification definition for classifying the specific set of the data according to a plurality of categories. The method further includes transforming the abstract query into a concrete query for execution against the database and executing the concrete query against the database to obtain a query result. Then, the query result is displayed. Thereby, data obtained for the at least one classification field is classified according to the corresponding classification definition.

Still another embodiment provides a computer-readable medium containing a program which, when executed by a processor, performs a process of constructing abstract classification fields. The process includes receiving user input specifying a logical field corresponding to a logical field specification of a data abstraction model. The data abstraction model abstractly describes data in a database. The logical field is associated with a specific set of the data. The process further includes receiving user input specifying a classification definition for the logical field. The classification definition is suitable for dividing the specific set of the data into a plurality of categories. Then, a classification field is generated on the basis of the logical field and the classification definition.

Still another embodiment provides a computer-readable medium containing a program which, when executed by a processor, performs a process for constructing queries capable of returning classified information related to data in a database. The process includes receiving user input specifying a plurality of result fields for an abstract query. Each result field corresponds to a logical field specification of a data abstraction model abstractly describing the data in the database. The process further includes receiving user input selecting one of the plurality of result fields, and receiving user input specifying a classification definition for the selected result field. The classification definition is suitable for dividing data to be returned for the selected result field into a plurality of categories. Then, a classification field for the abstract query is generated on the basis of the selected result field and the classification definition. The classification field is included with the abstract query. The process further includes receiving a user request for execution of the abstract query against the database.

Yet another embodiment provides a graphical user interface residing in memory. The graphical user interface includes a query specification display area, a classification field specification display area, a first selection element and a second selection element. The query specification display area is configured for specifying result fields and operators to define an abstract query. Each result field corresponds to a logical field specification of a data abstraction model abstractly describing data in a database. The data abstraction model includes metadata for mapping the result fields to the data in the database. The classification field specification display area is configured for specifying classification fields for the abstract query. Each classification field includes a result field and an associated classification definition. The classification field specification display area includes a result field window displaying a plurality of available result fields, and a plurality of graphical elements. The plurality of graphical elements is configured to allow specification of classification definitions for one or more selected result fields from the plurality of available result fields. Each classification definition is suitable for dividing data to be returned for a corresponding selected result field into a plurality of categories. The first selection element is configured for specifying whether the specified classification fields will be included with the abstract query for execution. The second selection element is configured for initiating execution of the abstract query according to the selection made using the first selection element.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 12 is a screen shot illustrating the interface of FIG. 9 after specification of classification fields.

DETAILED DESCRIPTION OF THE PREFERRED EMBODIMENTS

Introduction

Figure 1:
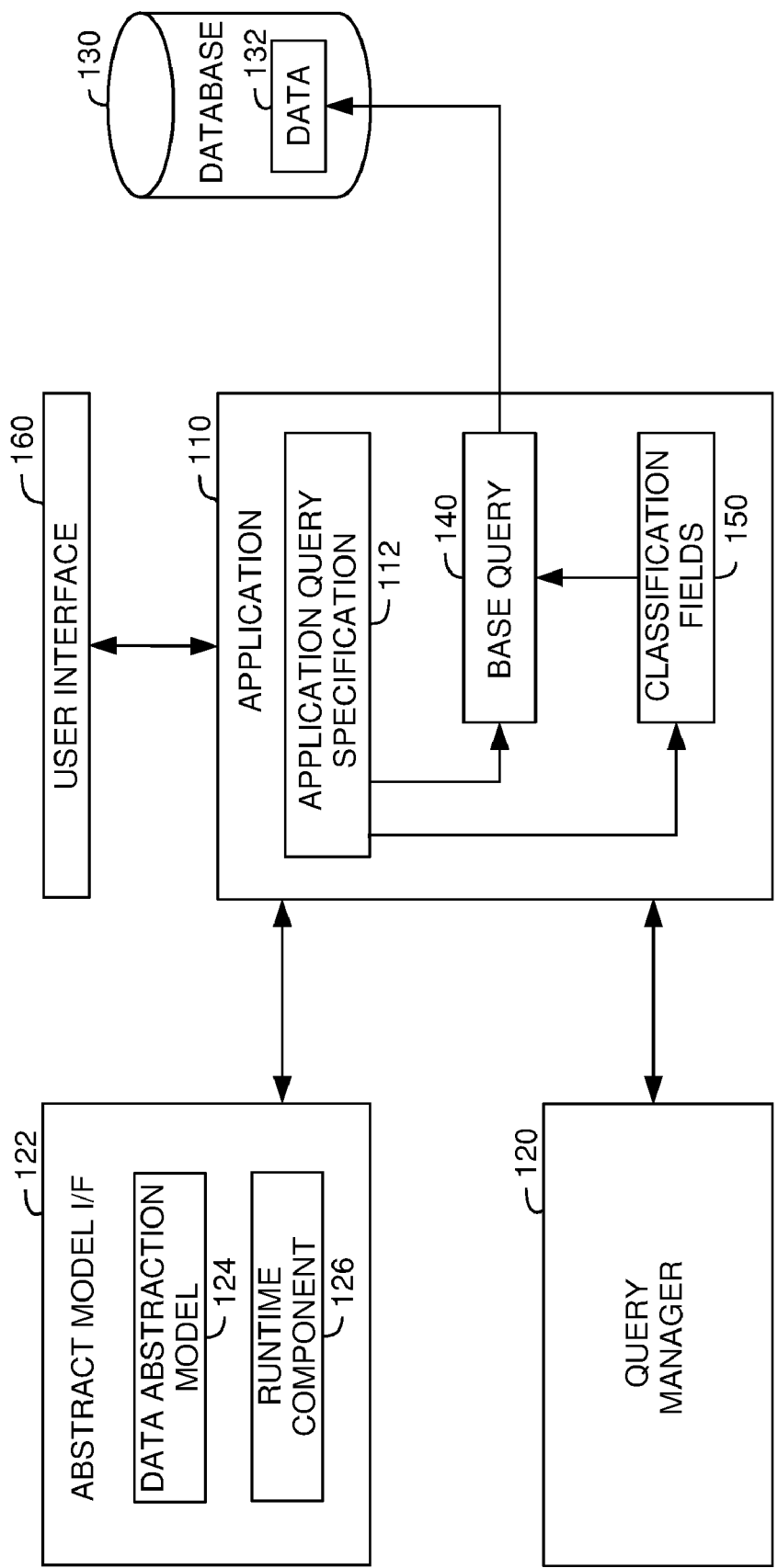
FIG. 1 is a relational view of software components in one embodiment.

The present invention is generally directed to a method, system and article of manufacture for constructing queries that are executed against a database and, more particularly, for constructing queries capable of returning classified information related to data in a database. Classified information is information related to a specific set of data in a database which is grouped into a plurality of predefined categories.

According to one aspect, a specific set of data in a database can be described using a logical field providing a logical representation of the specific set of the data. The logical field corresponds to a logical field specification of a data abstraction model defining the logical representation. The data abstraction model abstractly describes the data in the database. Using the logical field, an abstract classification field that is suitable for determining classified information related to the specific set of the data can be constructed. In general, an abstract classification field can be constructed for each logical field that abstractly describes an associated physical entity of data in a database.

In one embodiment, an abstract classification field is constructed using a user interface. The user interface can be configured for displaying one or more available logical fields. Using suitable input devices, the user can select a logical field from the one or more available logical fields and specify one or more classification definitions for the selected logical field. Each classification definition is suitable for dividing a specific set of data into a plurality of categories. According to one aspect, each classification definition defines criteria for segmenting the specific set of the data into the plurality of categories. Then, on the basis of the logical field and a given classification definition, the abstract classification field is generated.

In one embodiment, the one or more available logical fields are result fields of an initial query issued against the database. Upon execution of the initial query against the database, data is returned for each result field. The initial query and any other query that is not configured to determine classified information is also referred to herein as a base query. With each result field of a base query, a classification definition can be associated for specifying a classification query. Accordingly, a classification query is configured to return classified information for all result fields having one or more associated classification definitions upon execution of the classification query against the database.

According to one aspect, the base query is an abstract query. Accordingly, each result field of the base query corresponds to a logical field of a plurality of logical fields defined by a corresponding data abstraction model. In one embodiment, the abstract base query is constructed using a user interface. Using the user interface, a user can specify one or more result fields and operators to define the abstract base query. Using the data abstraction model, the abstract base query can be transformed into a concrete query, such as a concrete SQL query that is executed against one or more databases.

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer. Furthermore, embodiments of the present invention can apply to any comparable hardware configuration, regardless of whether the computer systems are complicated, multi-user computing apparatus, single-user workstations, or network appliances that do not have non-volatile storage of their own. Further, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Referring now to FIG. 1, a relational view of software components in one embodiment is illustrated. The software components include one or more applications 110 (only one application is illustrated for simplicity), a query manager 120, an abstract model interface 122 and a user interface 160.

According to one aspect, the application 110 (and more generally, any requesting entity including, at the highest level, users) issues queries, such as base query 140, against data 132 in a database 130. The queries issued by the application 110 are defined according to an application query specification 112. The application query specification(s) 112 and the abstract model interface 122 are further described below with reference to FIGS. 2-5.

The queries issued by the application 110 may be predefined (i.e., hard coded as part of the application 110) or may be generated in response to input (e.g., user input). In one embodiment, the queries (referred to herein as "abstract queries") are composed using logical fields defined by a data abstraction model 124. The abstract queries are transformed into a form consistent with the physical representation of the data 132. For instance, the abstract queries are translated by a runtime component 126 into concrete (i.e., executable) queries which are executed against the data 132 of the database 130.

The database 130 is representative of any collection of data regardless of the particular physical representation. By way of illustration, the database 130 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the application 110 uses the query manager 120 to determine information related to the base query 140. The determined information can be displayed to the user using the user interface 160 such that the user can select at least parts of the displayed information to create classification fields 150. Each classification field 150 is suitable for determining classified information related to a specific set of the data 132. One or more of the classification fields 150 can be included with the base query 140 to create a classification query. If the base query 140 is an abstract query, the classification query is also an abstract query that is transformed at runtime by the runtime component 126 into a concrete classification query for execution. The concrete classification query is executed against the data 132 of the database 130 to obtain the classified information. Interaction and operation of the application 110, the query manager 120 and the user interface 160 for constructing the classification fields 150 is explained in more detail below with reference to FIGS. 6-11.

Figure 2:
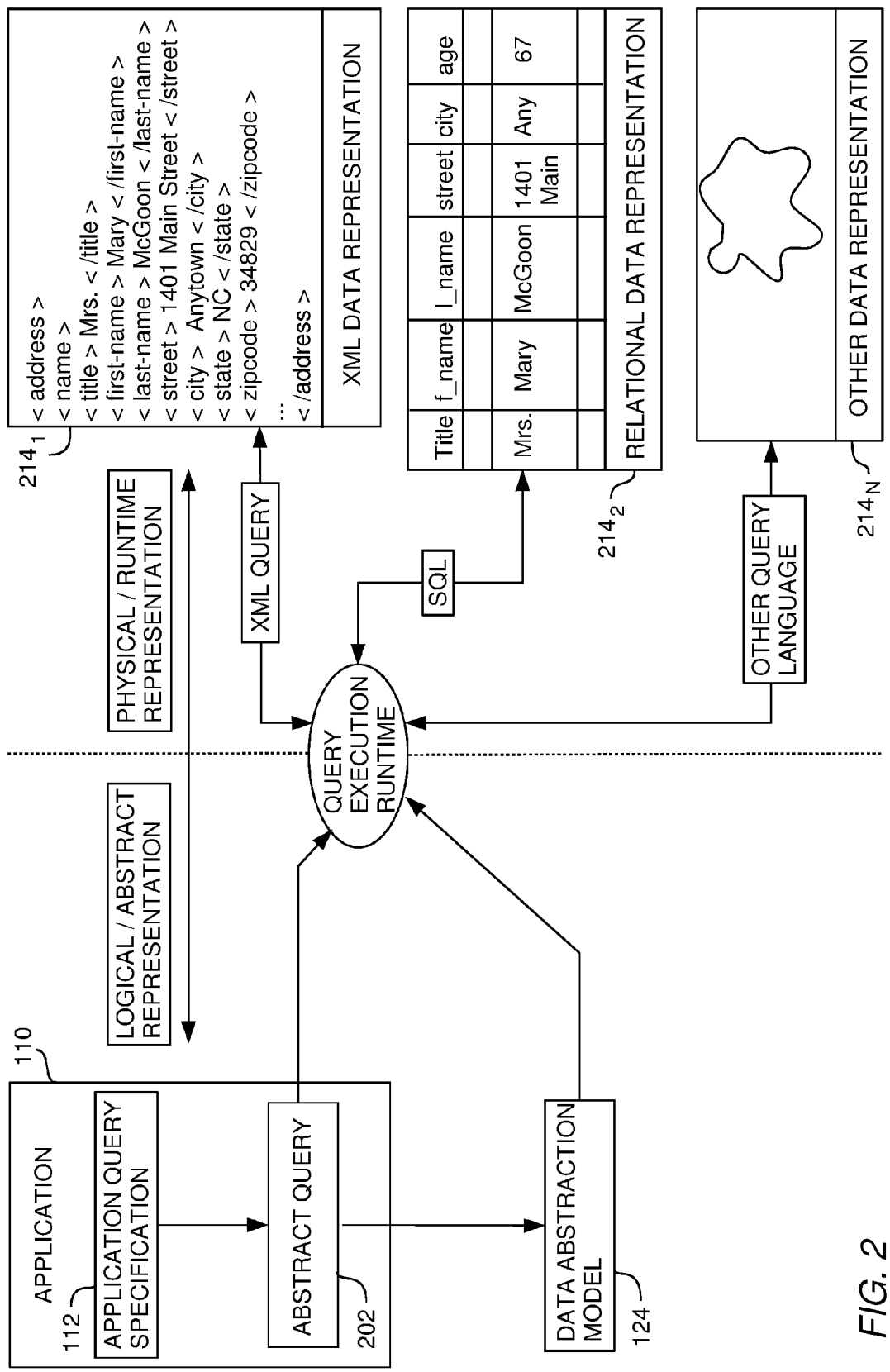
FIGS. 2-3 are relational views of software components for abstract query management.

Referring now to FIG. 2, a relational view illustrating operation and interaction of the application 110 and the abstract model interface 122 is shown. The data abstraction model 124 defines logical fields corresponding to physical entities of data in a database (e.g., database 130), thereby providing a logical representation of the data. In a relational database environment having a multiplicity of database tables, a specific logical representation having specific logical fields can be provided for each database table. In this case, all specific logical representations together constitute the data abstraction model 124. The physical entities of the data are arranged in the database 130 according to a physical representation of the data 132. By way of illustration, two physical representations are shown, an XML data representation $214_1$ and a relational data representation $214_2$. However, the physical representation $214_N$ indicates that any other physical representation, known or unknown, is contemplated. In one embodiment, a different single data abstraction model is provided for each separate physical representation 214, as explained above for the case of a relational database environment. In an alternative embodiment, a single data abstraction model 124 contains field specifications (with associated access methods) for two or more physical representations 214.

Figure 3:
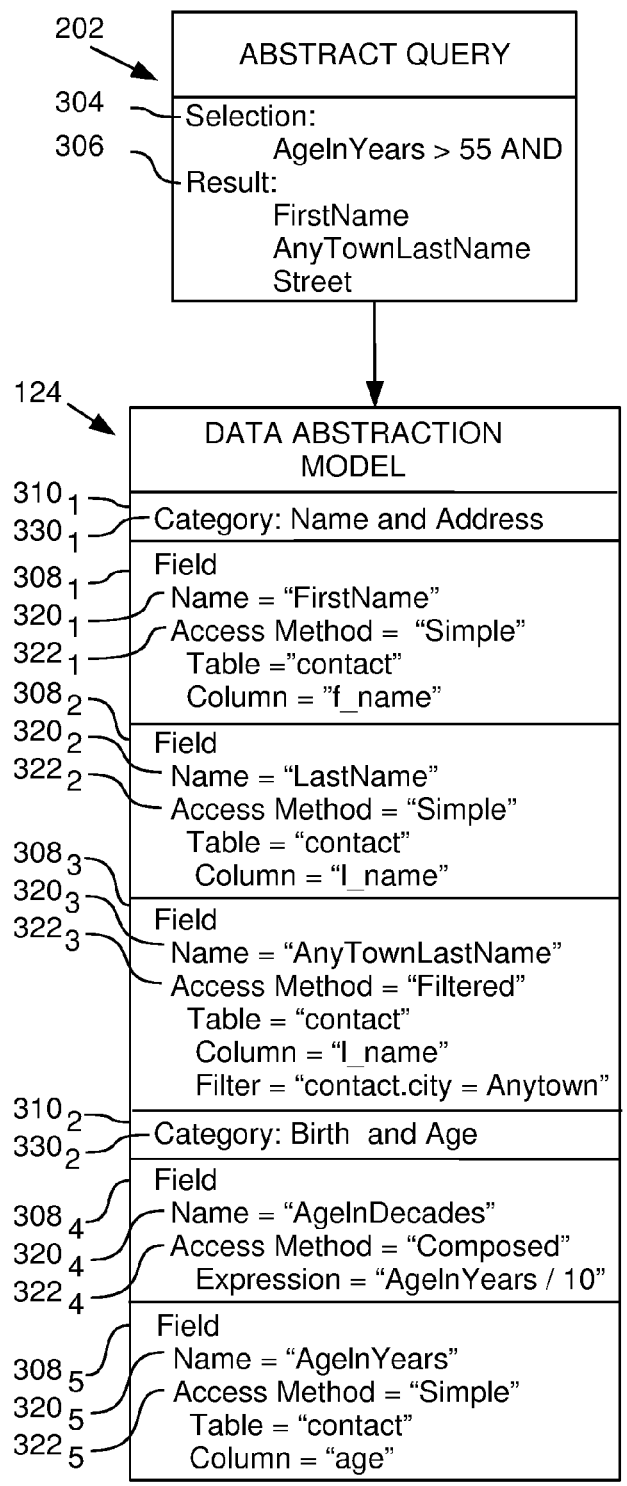

Using a logical representation of the data, the application query specification 112 specifies one or more logical fields to compose a resulting query 202 (e.g., base query 140). A requesting entity (e.g., the application 110) issues the resulting query 202 as defined by an application query specification of the requesting entity. In one embodiment, the abstract query 202 may include both criteria used for data selection and an explicit specification of result fields to be returned based on the data selection criteria. An example of the selection criteria and the result field specification of the abstract query 202 is shown in FIG. 3. Accordingly, the abstract query 202 illustratively includes selection criteria 304 and a result field specification 306.

The resulting query 202 is generally referred to herein as an "abstract query" because the query is composed according to abstract (i.e., logical) fields rather than by direct reference to the underlying physical data entities in the database 130. As a result, abstract queries may be defined that are independent of the particular underlying physical data representation used. For execution, the abstract query is transformed into a concrete query consistent with the underlying physical representation of the data using the data abstraction model 124.

In general, the data abstraction model 124 exposes information as a set of logical fields that may be used within an abstract query to specify criteria for data selection and specify the form of result data returned from a query operation. The logical fields are defined independently of the underlying physical representation being used in the database 130, thereby allowing abstract queries to be formed that are loosely coupled to the underlying physical representation.

Referring now to FIG. 3, a relational view illustrating interaction of the abstract query 202 and the data abstraction model 124 is shown. In one embodiment, the data abstraction model 124 comprises a plurality of field specifications $308_1$, $308_2$, $308_3$, $308_4$ and $308_5$ (five shown by way of example), collectively referred to as the field specifications 308. Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field name 320) and an associated access method attribute $322_1$, $322_2$, $322_3$, $322_4$, $322_5$ (collectively, access methods 322). Each attribute may have a value. For example, logical field name attribute $320_1$ has the value "FirstName" and access method attribute $322_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table.

Illustratively, the access method attribute $322_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, groups (i.e. two or more) of logical fields may be part of categories. Accordingly, the data abstraction model 124 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate (i.e., map) the logical field names to data in the database (e.g., database 130). Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular entity in the underlying physical representation (e.g., a field mapped to a given database table and column). By way of illustration, as described above, the simple field access method $322_1$ shown in FIG. 3 maps the logical field name $320_1$ ("FirstName") to a column named "f_name" in a table named "contact". The field specification $308_3$ exemplifies a filtered field access method $322_3$. Filtered fields identify an associated physical entity and provide filters used to define a particular subset of items within the physical representation. An example is provided in FIG. 3 in which the filtered field access method $322_3$ maps the logical field name $320_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more physical fields using an expression supplied as part of the access method definition. In this way, information which does not exist in the underlying physical data representation may be computed. In the example illustrated in FIG. 3 the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 124 shown in FIG. 3 are representative of logical fields mapped to data represented in the relational data representation $214_2$ shown in FIG. 2. However, other instances of the data abstraction model 124 map logical fields to other physical representations, such as XML.

An illustrative abstract query corresponding to the abstract query 202 shown in FIG. 3 is shown in Table I below. By way of illustration, the illustrative abstract query is defined using XML. However, any other language may be used to advantage.

TABLE I

ABSTRACT QUERY EXAMPLE

```
001  <?xml version="1.0"?>
002  <!--Query string representation: (AgeInYears > "55"-->
003  <QueryAbstraction>
004    <Selection>
005      <Condition internalID="4">
006      <Condition field="AgeInYears" operator="GT" value="55"
007         internalID="1"/>
008    </Selection>
009    <Results>
010      <Field name="FirstName"/>
011      <Field name="AnyTownLastName"/>
012      <Field name="Street"/>
013    </Results>
014  </QueryAbstraction>
```

Illustratively, the abstract query shown in Table I includes a selection specification (lines 004-008) containing selection criteria and a results specification (lines 009-013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 124 shown in FIG. 3 is shown in Table II below. By way of illustration, the illustrative Data Abstraction Model is defined using XML. However, any other language may be used to advantage.

TABLE II

DATA ABSTRACTION MODEL EXAMPLE

```
001  <?xml version="1.0"?>
002  <DataAbstraction>
003    <Category name="Name and Address">
004      <Field queryable="Yes" name="FirstName" displayable="Yes">
005        <AccessMethod>
006          <Simple columnName="f_name" tableName="contact"></Simple>
```

TABLE II-continued

DATA ABSTRACTION MODEL EXAMPLE

```
007            </AccessMethod>
008          </Field>
009          <Field queryable="Yes" name="LastName" displayable="Yes">
010            <AccessMethod>
011              <Simple columnName="l_name" tableName="contact"></Simple>
012            </AccessMethod>
013          </Field>
014          <Field queryable="Yes" name="AnyTownLastName" displayable="Yes">
015            <AccessMethod>
016              <Filter columnName="l_name" tableName="contact">
017        </Filter="contact.city=Anytown">
018            </AccessMethod>
019          </Field>
020        </Category>
021        <Category name="Birth and Age">
022          <Field queryable="Yes" name="AgeInDecades" displayable="Yes">
023            <AccessMethod>
024              <Composed columnName="age" tableName="contact">
025              </Composed Expression="columnName/10">
026            </AccessMethod>
027          </Field>
028          <Field queryable="Yes" name="AgeInYears" displayable="Yes">
029            <AccessMethod>
030              <Simple columnName="age" tableName="contact"></Simple>
031            </AccessMethod>
032          </Field>
033        </Category>
034    </DataAbstraction>
```

By way of example, note that lines 004-008 correspond to the first field specification $308_1$ of the DAM 124 shown in FIG. 3 and lines 009-013 correspond to the second field specification $308_2$.

Figure 4:
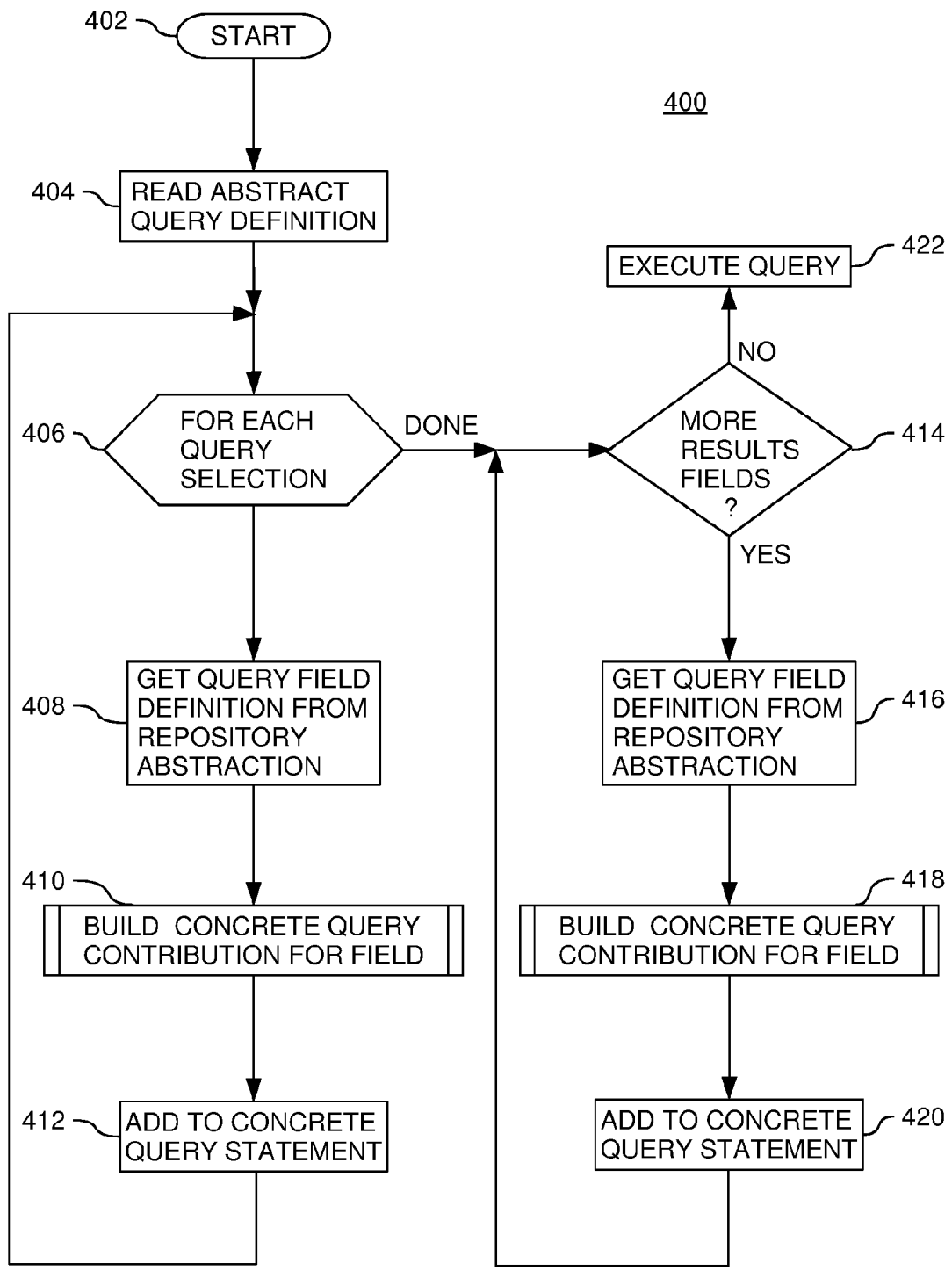
FIGS. 4-5 are flow charts illustrating the operation of a runtime component.

Referring now to FIG. 4, an illustrative runtime method 400 exemplifying one embodiment of the operation of the runtime component 126 is shown. The method 400 is entered at step 402 when the runtime component 126 receives as input an abstract query (such as the abstract query shown in Table I). At step 404, the runtime component 126 reads and parses the abstract query and locates individual selection criteria and desired result fields. At step 406, the runtime component 126 enters a loop (comprising steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 126 uses the field name from a selection criterion of the abstract query to look up the definition of the field in the data abstraction model 124. As noted above, the field definition includes a definition of the access method used to access the physical data associated with the field. The runtime component 126 then builds (step 410) a concrete query contribution for the logical field being processed. As defined herein, a concrete query contribution is a portion of a concrete query that is used to perform data selection based on the current logical field. A concrete query (e.g., base query 140 of FIG. 1) is a query represented in languages like SQL and XML Query and is consistent with the data of a given physical data repository (e.g., a relational database or XML repository). Accordingly, the concrete query is used to locate and retrieve data from the physical data repository, represented by the database 130 shown in FIG. 1. The concrete query contribution generated for the current field is then added to a concrete query statement. The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 126 identifies the information to be returned as a result of query execution. As described above, in one embodiment, the abstract query defines a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 126 looks up a result field name (from the result specification of the abstract query) in the data abstraction model 124 and then retrieves a result field definition from the data abstraction model 124 to identify the physical location of data to be returned for the current logical result field. The runtime component 126 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
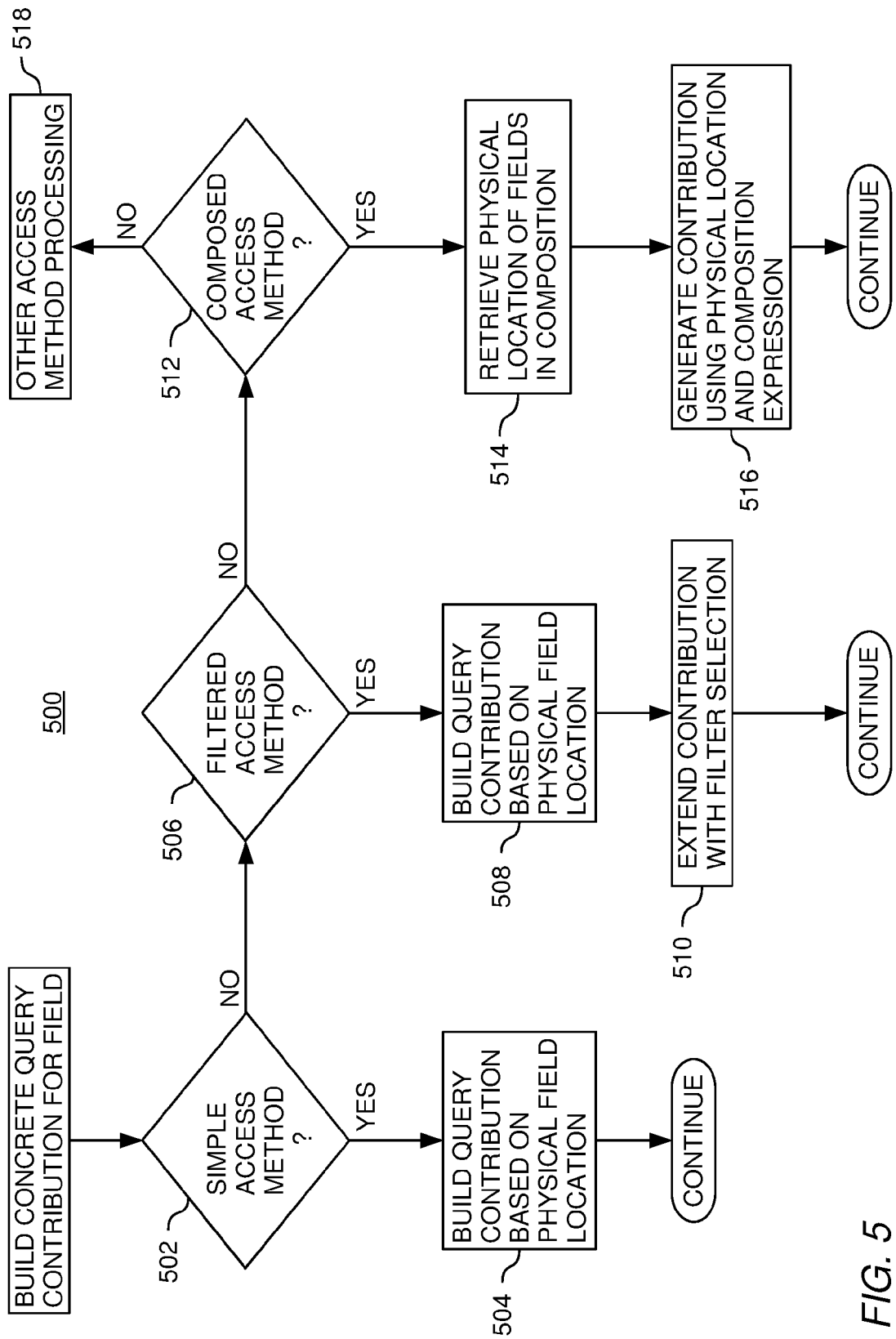

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for some physical data entity. At step 510, the concrete query contribution is extended with additional logic (filter selection) used to subset data associated with the physical data entity. Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As was noted above, an abstract query may include one or more classification fields. Thus, the abstract query can be used for determining classified information related to a specific set of data in a database on the basis of the one or more classification fields. Construction and application of classification fields is explained in the following with reference to FIGS. 6-11.

Figure 6:
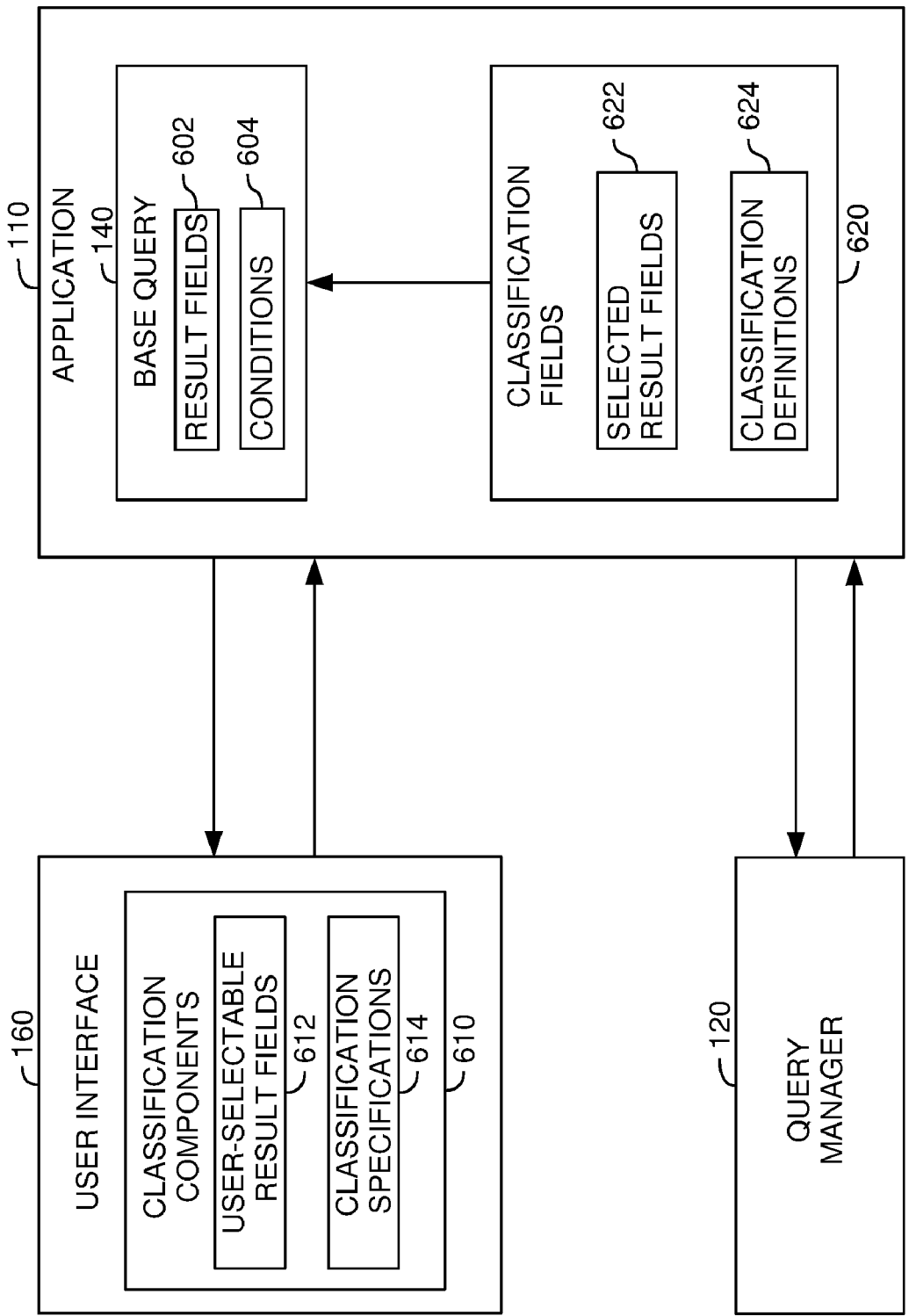
FIG. 6 is a relational view of software components in one embodiment.

Referring now to FIG. 6, one embodiment of the application 110, the query manager 120 and the user interface 160 of FIG. 1 for constructing abstract classification fields (e.g., classification fields 150 of FIG. 1) for an abstract query is illustrated. In one embodiment, the user interface 160 is adapted for specification of components of a base query, such as result fields and query condition operators. Accordingly, a requesting entity such as a user can specify the base query 140 of FIG. 1 using the user interface 160. The base query 140 is issued by the application 110. The base query 140 illustratively includes one or more result fields 602, for which data is to be returned from the database, and one or more query conditions 604 specifying selection criteria for the data to be returned. An exemplary user interface for selecting the one or more result fields 602 and the one or more query conditions 604 is explained below with reference to FIGS. 8-9.

By way of example, assume that the exemplary abstract base query shown in Table III below is created using the user interface 160 (for brevity, only parts that are relevant for the following explanations are shown). The exemplary abstract base query is issued to determine the PatientID, Gender and Age for every person in a database table Patientinfo (e.g., data 132 in the database 130 of FIG. 1) having the American citizenship. By way of illustration, the exemplary abstract base query is defined using XML. However, any other language may be used to advantage.

TABLE III

ABSTRACT BASE QUERY EXAMPLE

| 001 | <?xml version="1.0"?> |
| 002 | <QueryAbstraction> |
| 003 |   <Selection> |
| 004 |     <Condition field="Citizenship" operator="EQ" value="American"/> |

TABLE III-continued

ABSTRACT BASE QUERY EXAMPLE

| 005 |   </Selection> |
| 006 |   <Results> |
| 007 |     <Field name="PatientID"/> |
| 008 |     <Field name="Gender"/> |
| 009 |     <Field name="Age"/> |
| 010 |   </Results> |
| 011 | </QueryAbstraction> |

As can be seen from lines 003-005, the exemplary abstract base query specifies as a selection criterion that only data records having, in a "Citizenship" column of the "Patientinfo" table, a value "American" should be selected and returned. The specification of selection criteria (i.e., conditions) is described with respect to FIG. 8 below. Furthermore, in lines 006-011 the exemplary abstract base query specifies three different result fields, "PatientID", "Gender" and "Age". Selection of these result fields is described below with reference to FIG. 9.

The exemplary abstract base query can be transformed into a concrete (i.e., executable) base query shown in Table IV below. By way of illustration, the exemplary concrete base query is defined using SQL. However, any other language may be used to advantage.

TABLE IV

EXEMPLARY CONCRETE SQL BASE QUERY

| 001 | SELECT PatientID, Gender, Age |
| 002 | FROM Patientinfo |
| 003 | WHERE Citizenship='American' |

As can be seen from line 002, the exemplary concrete SQL base query is executed against the database table "Patientinfo". The database table has been determined from a corresponding data abstraction model (e.g., data abstraction model 124 of FIG. 1) used for transforming the exemplary base query of Table III into the concrete SQL base query of Table IV. An exemplary database table "Patientinfo" is shown in Table V below.

TABLE V

EXEMPLARY DATABASE TABLE "PATIENTINFO"

| 001 | PatientID | Age | Citizenship | Gender | City |
|---|---|---|---|---|---|
| 002 | 1 | 45 | American | Male | Rochester |
| 003 | 2 | 17 | American | Female | LaCrosse |
| 004 | 3 | 33 | Caucasian | Male | Rochester |
| 005 | 4 | 9 | American | Female | LaCrosse |
| 006 | 5 | 16 | Asian | Female | Rochester |
| 007 | 6 | 72 | Russian | Male | LaCrosse |
| 008 | 7 | 15 | Asian | Male | Rochester |
| 009 | 8 | 29 | American | Male | LaCrosse |
| 010 | 9 | 80 | German | Male | Rochester |
| 011 | 10 | 75 | Hispanic | Male | LaCrosse |
| 012 | 11 | 53 | American | Female | Rochester |
| 013 | 12 | 67 | American | Female | LaCrosse |
| 014 | 13 | 31 | American | Male | Rochester |
| 015 | 14 | 47 | German | Female | LaCrosse |
| 016 | 15 | 19 | Hispanic | Male | Rochester |
| 017 | 16 | 28 | Asian | Male | LaCrosse |

As can be seen from Table V, the "Patientinfo" table illustratively contains age, race, gender and address (city) information about each patient. The "Patientinfo" table further includes a "PatientID" column having values that uniquely identify each patient.

Upon execution of the exemplary concrete SQL base query against the database table illustrated in Table V, the result table illustrated in Table VI below is returned.

TABLE VI

EXEMPLARY CONCRETE SQL QUERY RESULTS

| 001 | Patient_ID | Age | Gender |
|---|---|---|---|
| 002 | 1 | 45 | M |
| 003 | 2 | 17 | F |
| 004 | 4 | 9 | F |
| 005 | 8 | 29 | M |
| 006 | 11 | 53 | F |
| 007 | 12 | 67 | F |
| 008 | 13 | 31 | M |

Referring again to FIG. 6, the user interface 160 includes a classification field specification display area 610 (hereinafter referred to as "component display area") which is adapted for specification of classification field components. Illustratively, the component display area 610 includes a result field window 612 and a classification definition specification window 614. The result field window 612 is configured to display one or more user-selectable result fields. The user-selectable result fields displayed in the result field window 612 include at least one of the result fields 602. The classification definition specification window 614 is configured to display a plurality of graphical elements. The graphical elements allow user specification of classification definitions for one or more selected result fields from the user-selectable result fields.

More specifically, using the result field window 612, the user can select one or more of the user-selectable result fields. Then, using the graphical elements of the classification definition specification window 614, the user can specify a classification definition 624 for each selected result field 622. Each classification definition 624 is suitable for dividing a specific set of data from a database (e.g., data 132 in database 130 of FIG. 1) into a plurality of categories. To this end, each classification definition 624 may define criteria for segmenting the specific set of the data, such as boundary values or ranges of values. Using the selected result fields 622 and the corresponding classification definitions 624, the query manager 120 constructs classification fields 620. Selection of result fields and specification of corresponding classification definitions is explained in more detail below with reference to FIGS. 7 and 9-11.

In one embodiment, the application 110 stores the base query 140 together with the classification fields 620 as a single query data object using the query manager 120. More specifically, the query manager 120 initially creates a query data object using all information included with the base query 140, i.e., the result fields 602 and the query conditions 604. Then, the query manager 120 can add all classification fields 620 to the query data object. However, instead of adding the classification fields 620 to the query data object, the query manager 120 may alternatively create a classification field data object for storing the classification fields 620. The classification field data object can be stored persistently regardless of the query data object for the base query 140. In this case, the query manager 120 may add a reference to the classification field data object to the query data object, so that the classification fields 620 can be retrieved from the classification field data object using the reference, when required. Thus, the classification fields 620 can be added to the base query 140 at any user-determined point of time. Furthermore, storing the classification fields 620 separately in the classification field data object allows for a reuse of the classification fields 620 in subsequently issued abstract queries. For instance, a representation of the classification fields 620 stored in the classification field data object can be displayed in the component display area 610 each time a result field corresponding to one of the selected result fields 622 from the classification fields 620 is displayed in the result field window 612.

In other words, storing the base query 140 and the classification fields 620 in one or more data objects allows execution of either the base query 140 or a classification query according to user selection. User selection of whether to run the base query 140 or the classification query against the database is explained in more detail below with reference to FIG. 9. More specifically, if the user elects to run the base query 140 against the data in the database, only the result fields 602 and the query conditions 604 of the base query 140 are used in creating a corresponding concrete query. If, however, the user elects to run the classification query against the data in the database, all information included in the base query 140 and the classification fields 620 is used to create the corresponding concrete query.

With reference to FIG. 6, construction of abstract classification fields has been described for result fields of an abstract query. However, it should be noted that abstract classification fields can be constructed for any logical field that abstractly describes an associated physical entity of data in a database independent of an abstract query. Furthermore, using a given logical field, a plurality of different abstract classification fields can be constructed by providing a plurality of corresponding classification definitions. Thus, the above explanations are only for illustration and should not be construed to limit the invention.

Figure 7:
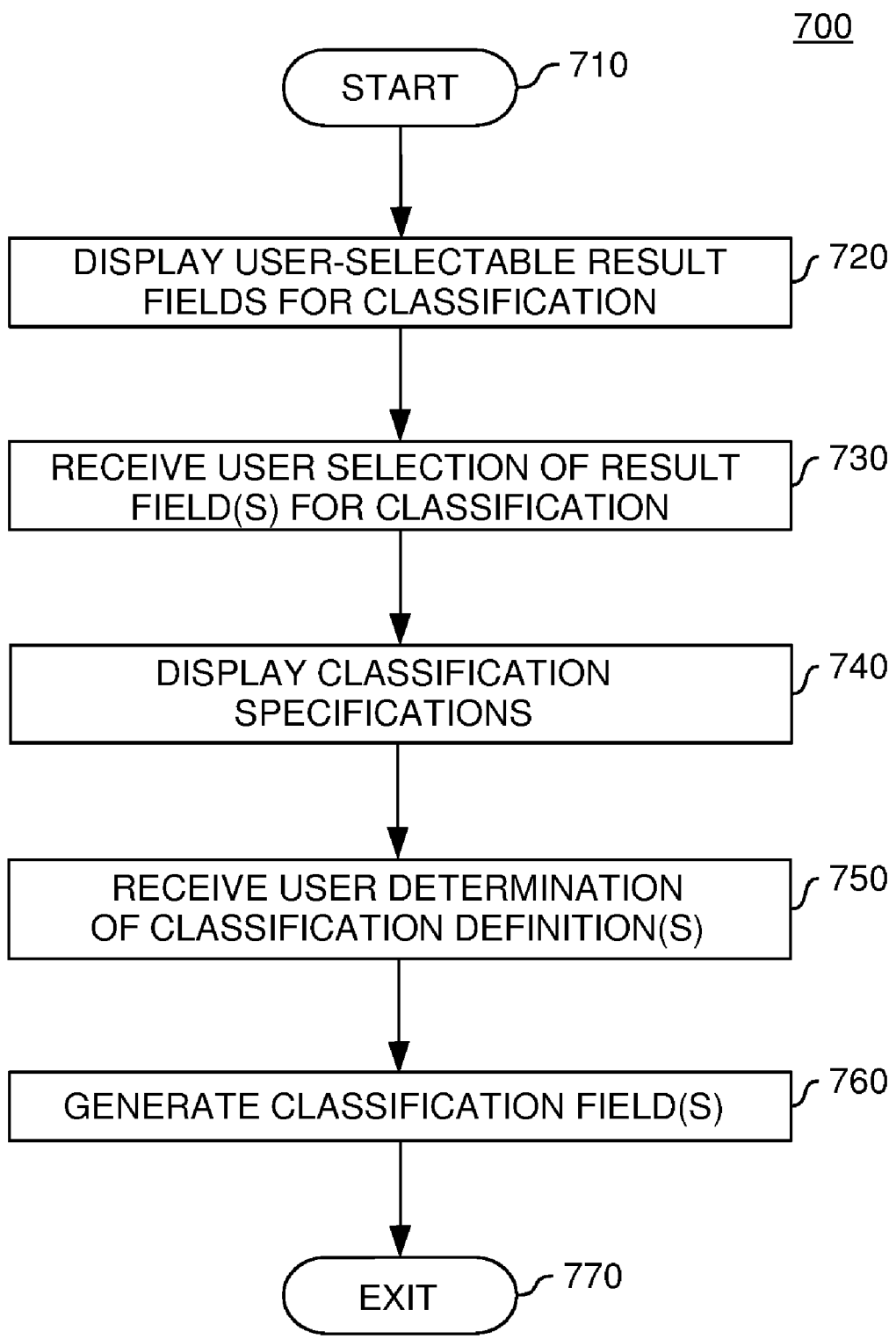
FIG. 7 is a flow chart illustrating a method for constructing abstract classification fields in one embodiment.

Referring now to FIG. 7, one embodiment of a method 700 for constructing abstract classification fields (e.g., classification fields 150 of FIG. 1) is illustrated. In one embodiment, the method 700 is be performed by the query manager 120 of FIG. 1. Furthermore, at least several steps of the method 700 can be performed on the basis of user input received via the user interface 160 of FIG. 1. Method 700 starts at step 710.

At step 720, user-selectable result fields are displayed. For instance, the user-selectable result fields are displayed in a result field window of the user interface (e.g., result field window 612 of FIG. 6). At step 730, a user selection of a result field from the user-selectable result fields is received. An exemplary user interface illustrating selection of a result field is described below with reference to FIG. 9

At step 740 a plurality of graphical elements is displayed. The graphical elements are configured to allow user specification of a classification definition for the selected result field. The graphical elements can be displayed in a classification definition specification window of the user interface (e.g., classification definition specification window 614 of FIG. 6). At step 750, user input specifying the classification definition is received. The user input may include selection of one or more graphical elements from the plurality of graphical elements. Exemplary user interfaces illustrating specification of a classification definition for the selected result field are described below with reference to FIGS. 10-11.

At step 760 the query manager determines the classification field using the selected result field and the specified classification definition. In one embodiment, if another classification field should be created, processing returns to step 720. For instance, if the user wishes to create another classification field on the basis of the selected result field, another classification definition can be specified as described above.

Accordingly, steps 720-760 form a loop which is executed for each classification field to be created. Method 700 then exits at step 770.

Figure 8:
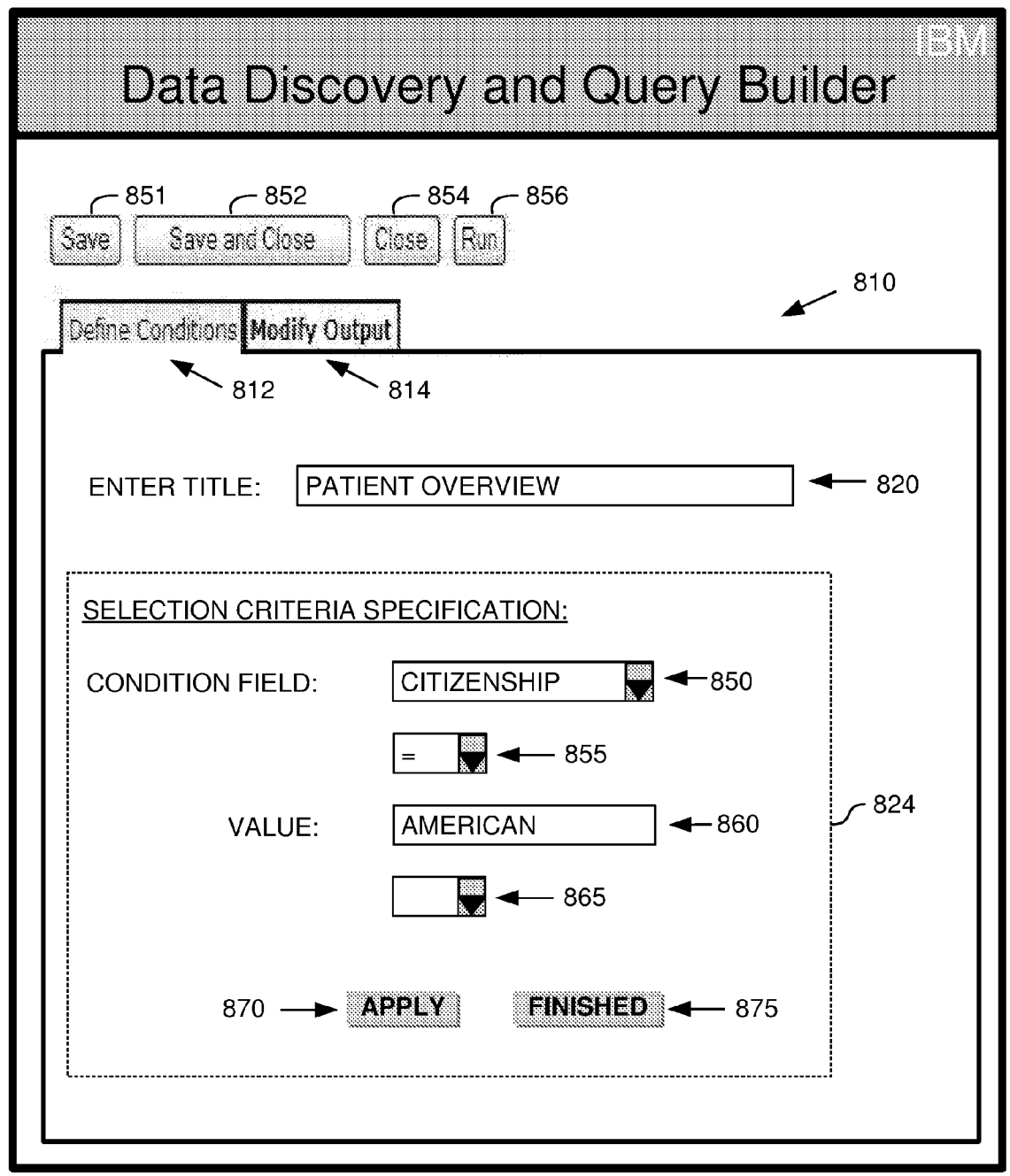
FIG. 8 is a screen shot illustrating an interface for specification of selection criteria in one embodiment.

With reference now to FIGS. 8-11 graphical user interfaces will be described which are configured for composing queries and constructing abstract classification fields. Each of the described graphical user interface screens corresponds to one of the screens of the user interface 160 (FIG. 6). Referring first to FIG. 8, an illustrative graphical user interface (GUI) screen 800 is shown which corresponds to one of the screens of the user interface 160 (FIG. 6). The GUI screen 800 shows two selectable tabs, a "Define Conditions" tab 812 and a "Modify Output" tab 814. When the "Define Conditions" tab 812 is selected, a panel 810 is displayed. Illustratively, the panel 810 includes a field 820 for input of a query title. By way of example, the title "PATIENT OVERVIEW" has been input for an abstract query. The panel 810 further includes a selection criteria specification area 824.

The selection criteria specification area 824 is adapted for specification of selection criteria (e.g., query conditions 604 of FIG. 6). More specifically, using the selection criteria specification area 824, the user can specify one or more query conditions. To this end, one or more condition fields can be selected from a selection field 850. For each selected condition field, a query condition operator can be determined using a selection field 855 and a condition value can be assigned to the selected condition field using the input field 860. If more than one condition field is selected, the selected condition fields can be combined using operators, which can be selected from a selection field 865. After specification of each query condition, a pushbutton "APPLY" 870 can be clicked to include the specified query condition in the abstract query. When the query condition specification is completed, a pushbutton "FINISHED" 875 can be clicked to indicate completion.

However, it should be noted that specification of query conditions is optional. In other words, in one embodiment classification fields can be created for logical fields of a data abstraction model without specification of query conditions for a corresponding abstract query. Accordingly, an abstract query may be defined using only result fields, an example of which is described below.

Then, by selecting the "Modify Output" tab 814, display of a GUI allowing for specification of result fields for the abstract query can be launched. Thus, a plurality of result fields (e.g., result fields 602 of FIG. 6) can be selected. An illustrative GUI for selection of result fields is explained in more detail below with reference to FIG. 9.

Illustratively, the GUI screen 800 further includes four pushbuttons 851, 852, 854 and 856. By clicking the pushbutton "Save" 850, a query data object can be created for the abstract query and persistently stored. If the pushbutton "Save and Close" 852 is clicked, a query data object is created for the abstract query and persistently stored and the GUI screen 800 is closed. The pushbutton "Close" 854 can be used to close the GUI screen 800 without taking any further action. The pushbutton "Run" 856 can be used to initiate execution of the abstract query (e.g., the abstract base query of Table III).

Figure 9:
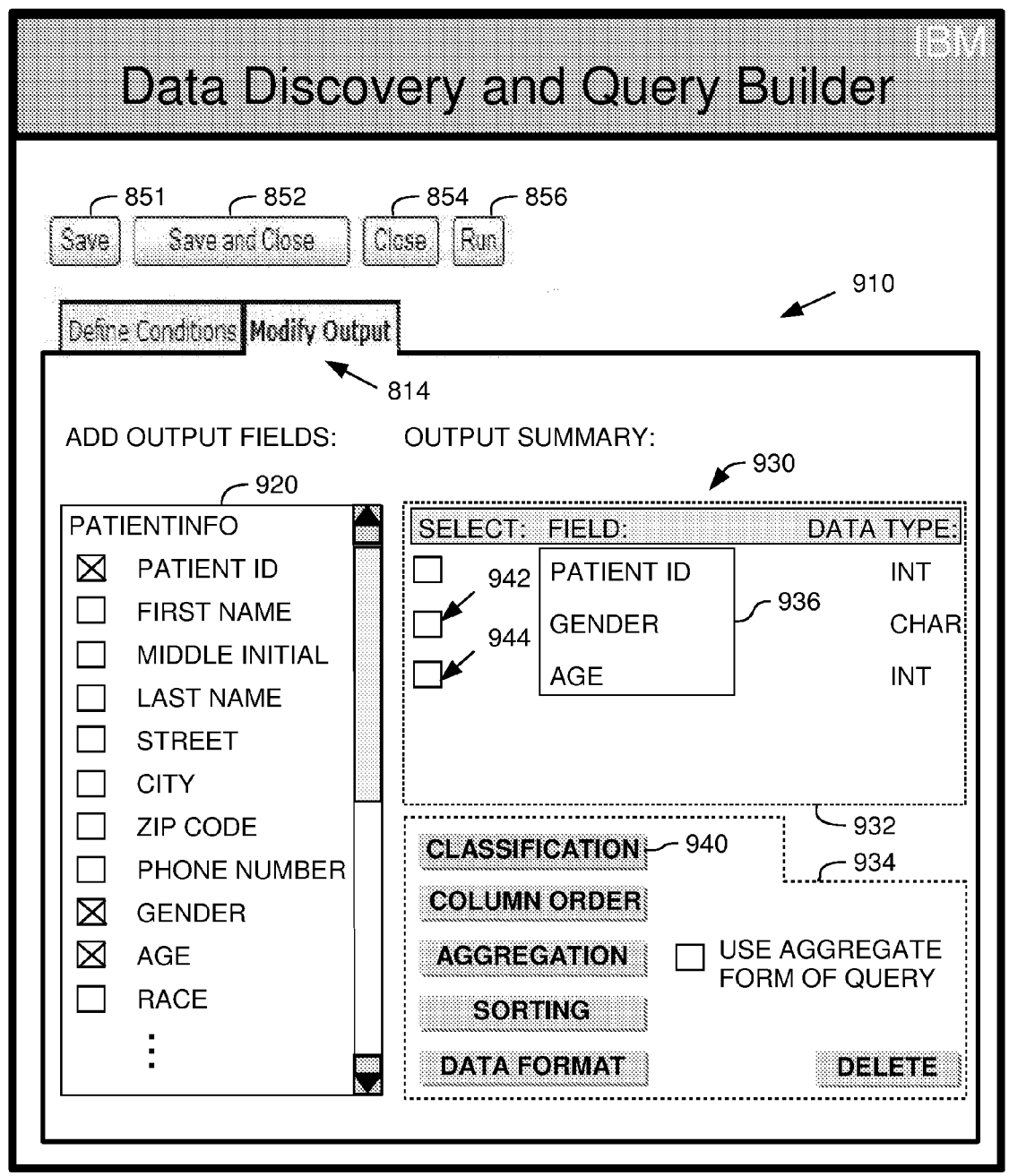
FIG. 9 is a screen shot illustrating an interface for selection of result fields to be classified in one embodiment.

Referring now to FIG. 9, the illustrative GUI screen 800 of FIG. 8 is shown after selection of the "Modify Output" tab 814. Accordingly, a panel 910 is displayed. The panel 910 includes a result field window 920 (e.g., result field window 612 of FIG. 6) displaying a list of user-selectable result fields, and a plurality of graphical elements 930. The plurality of graphical elements 930 includes a text display area 932 including summary information for an abstract query (e.g., base query 140 of FIG. 1) and graphical selection elements 934 (shown as "buttons"). Each button is provided for a corresponding selectable operation of a plurality of operations that can be performed on the abstract query or on one or more result field of the abstract query. The result field window 920 and the graphical elements 930 enable selection of one or more of the result fields for an abstract query and one or more of the selectable operations.

More specifically, the text display area 932 illustratively includes a list 936 of result fields which have been selected for the abstract query from the result field window 920. Each selected result field has an associated checkbox. In other words, in response to selection of a result field from the result field window 920, a corresponding entry in the list 936 and an associated checkbox are displayed in the text display area 932. Each checkbox can be clicked for selecting the associated selected result field for further processing. Furthermore, the checkboxes can be used to select the associated selected result field for use in the abstract query.

For instance, when a checkbox 942 is clicked, a result field "Gender" is selected from the list 936 for further processing. If subsequently a pushbutton "Classification" 940 is clicked, a user interface configured for specifying a classification definition for the result field "Gender" is displayed. An exemplary user interface illustrating specification of a classification definition for the "Gender" result field is described below with reference to FIG. 10. When a checkbox 944 is clicked, a result field "Age" is selected from the list 936 for further processing. If subsequently the pushbutton "Classification" 940 is clicked, a user interface configured for specifying a classification definition for the result field "Age" is displayed. An exemplary user interface illustrating specification of a classification definition for the "Age" result field is described below with reference to FIG. 11. When specification of the classification definitions for the "Gender" and "Age" result fields is completed, indications of corresponding classification fields can be displayed in the text display area 932, as illustrated in FIG. 12.

Figure 10:
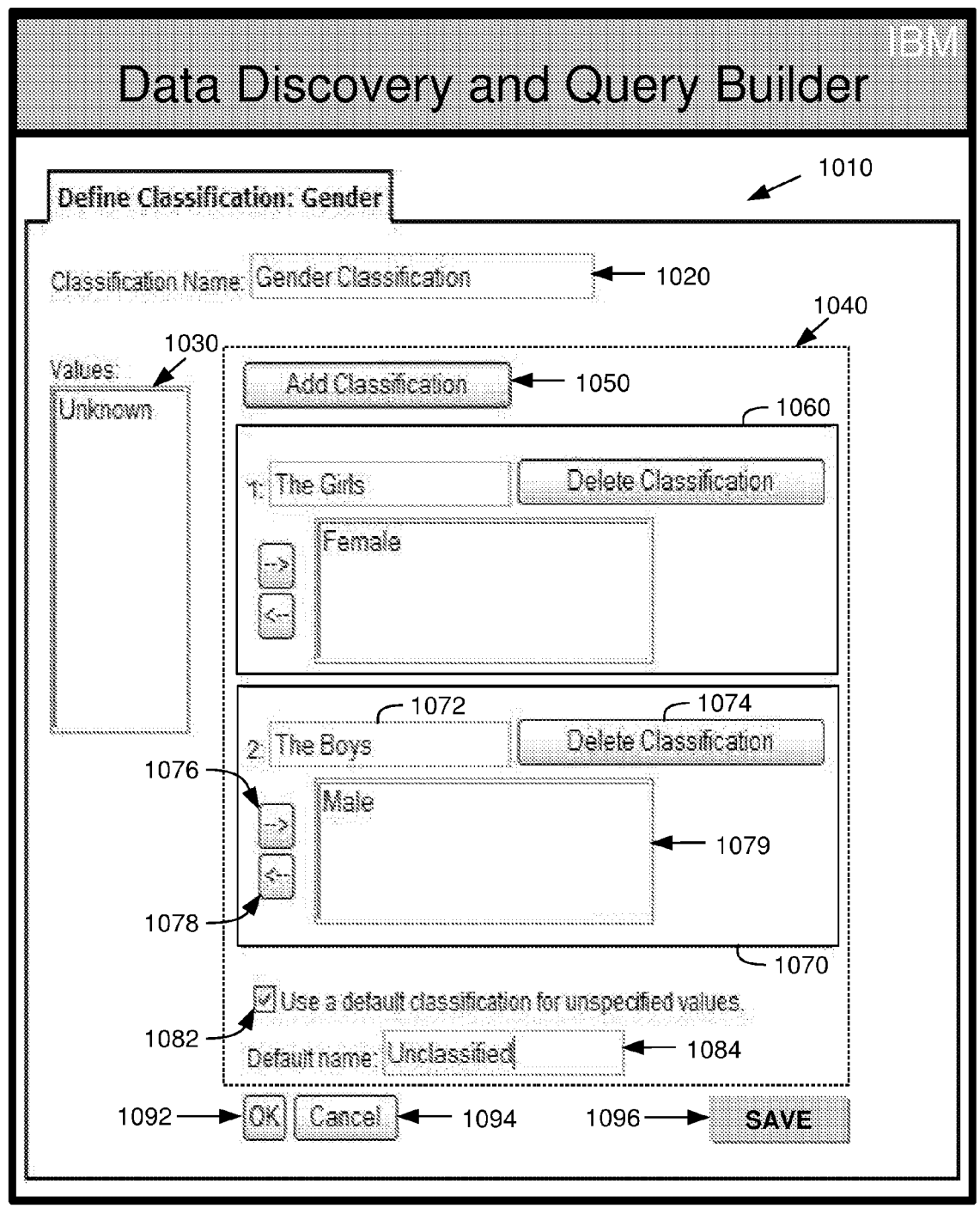
FIGS. 10-11 are screen shots illustrating interfaces for specification of classification definitions for classification fields in one embodiment.

Referring now to FIG. 10, the illustrative GUI screen 800 of FIG. 9 is shown after selection of the "Gender" result field from the list 936 of FIG. 9 using the checkbox 942 and a subsequent click on the pushbutton "Classification" 940. Illustratively, the GUI screen 800 shows a "Define Classification: Gender" panel 1010. The panel 1010 includes a text field 1020 configured for input of a name of the classification field to be created. By way of example, the user has entered the name "Gender Classification" for the classification field. The panel 1010 further includes a result value window 1030 having a list of result values, and a definition input area 1040. In one embodiment, the result values may represent values available for the "Gender" result field, e.g., values of the "Gender" column of the "Patientinfo" table of Table V. The definition input area 1040 includes a plurality of graphical elements.

More specifically, the result value window 1030 enables for selection of one or more result values. The definition input area 1040 allows for user specification of one or more classification categories. In one embodiment, the user can click on a pushbutton "Add Classification" 1050 to create a new classification category. Illustratively, the user has created two classification categories exemplified by category representations 1060 and 1070 (hereinafter referred to as "categories" 1060 and 1070). For brevity, only creation of the category 1070 is explained in more detail in the following.

By way of example, assume that after creation of the category 1060 the user clicks on the pushbutton "Add Classification" 1050 to create the category 1070. According to one aspect, in response to the click on the pushbutton "Add Classification" 1050, a category template having all graphical elements of the category 1070 is displayed in the definition input area 1040. More specifically, the displayed category template includes a text box 1072, pushbuttons 1074-1078 and a selection window 1079. The user can use the text box 1072 to enter a name for the category 1070. Illustratively, the user entered the name "The Boys" as a category name. The user can click on the pushbutton "Delete Classification" 1074 to remove the category 1070. Furthermore, the user can use the pushbuttons 1076 and 1078 to respectively add or remove result values from the result value window 1030 to the category 1070. All selected result values which are added to the category 1070 are displayed in the selection window 1079. By way of example, the user has selected a result value "Male" from the result value window 1030 and clicked on the pushbutton 1076. Thus, the result value "Male" has been added to the category "The Boys" 1070 and is, therefore, displayed in the selection window 1079. Accordingly, the category name "The boys" is returned for each result value "Male" from the "Gender" result field upon execution of an abstract query including the "Gender Classification" field.

The definition input area 1040 further includes a checkbox 1082 that can be clicked if specification of a default category is requested. A default category can be specified for each result value from the result value window 1030 which does not fit into one of the specified categories 1060 and 1070. Illustratively, the checkbox 1082 has been clicked and "Unclassified" has been entered into an associated text box 1084 as name for the default category.

Upon completion of the specification of the classification definition, the user can click on a pushbutton "OK" 1092 to initiate creation of the "Gender Classification" field using the result field "Gender" and the specified classification definition. Furthermore, the user can click on a pushbutton "Save" 1096 to initiate creation and storage of a classification field data object for the "Gender Classification" field. In this way, the classification field data object can be stored persistently and subsequently retrieved for use in the same or a different query. However, if the user does not want to use the specified "Gender Classification" definition, the user may click on a pushbutton "Cancel" 1094 to delete the classification definition. Processing then returns to display of the panel 910 of FIG. 9 as illustrated in FIG. 12.

Figure 11:
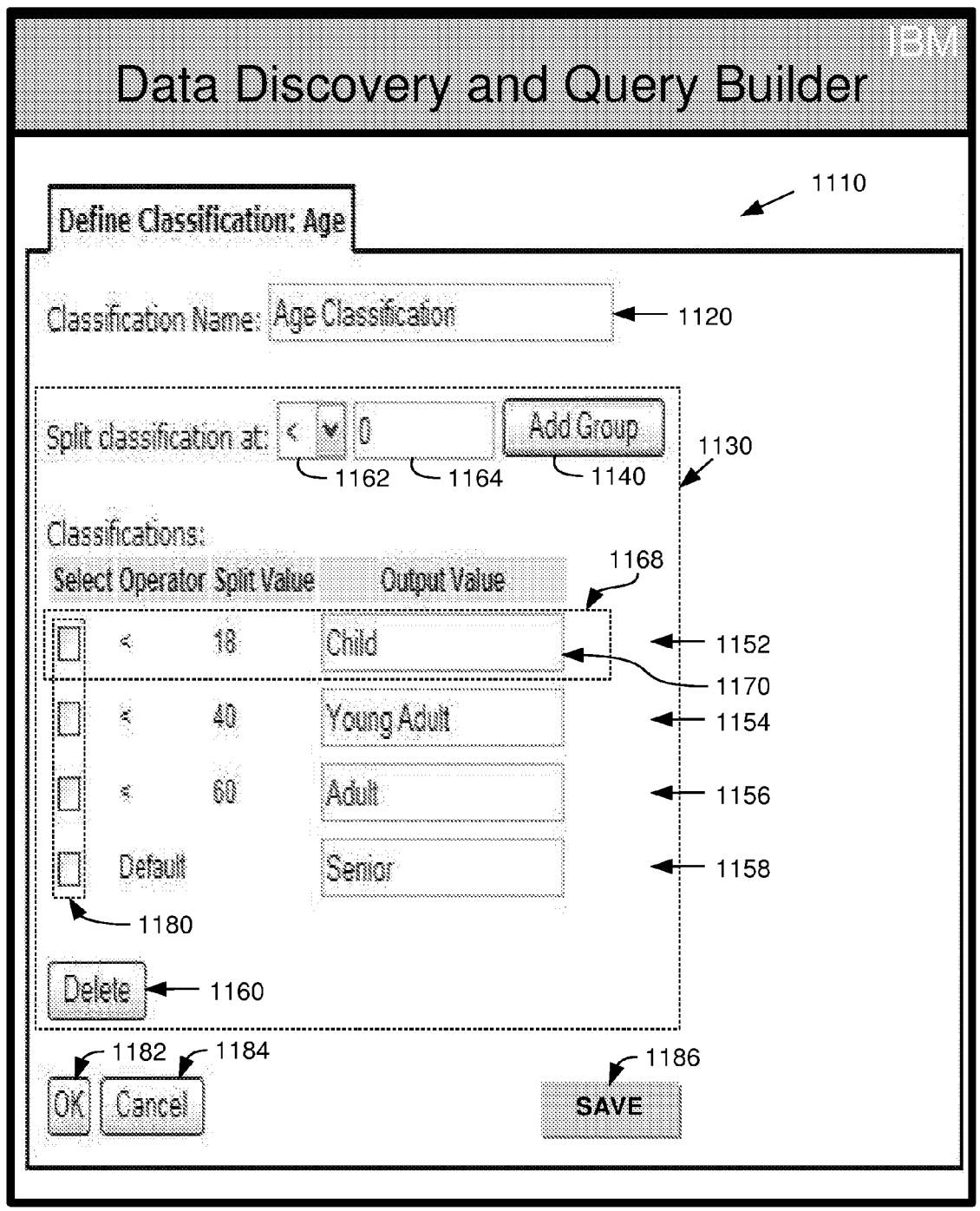

It should be noted that in the example described above the result values of the "Gender" result field describe the gender of human individuals which is determined by a restricted range of values. More specifically, it can be expected that the result values are limited to two values, i.e., "Male" and "Female". Thus, these two values can be segmented into two different categories, i.e., the categories 1060 and 1070, using the GUI screen 800 of FIG. 10 for classification purposes. More generally, it should be noted that the panel 1010 of the GUI screen 800 shown in FIG. 10 is useful for classifying any result values of a restricted range of values, and result fields with unrestricted ranges of values, in which case the user may arbitrarily define the boundaries of two or more categories. FIG. 11 shows an exemplary user interface illustrating specification of a classification definition for a selected result field having an unrestricted range of associated result values. Illustratively, FIG. 11 represents the illustrative GUI screen 800 of FIG. 9 after selection of the "Age" result field from the list 936 using the checkbox 944 and a subsequent click on the pushbutton "Classification" 940. Illustratively, the GUI screen 800 shows a "Define Classification: Age" panel 1110. The panel 1110 includes a text field 1120 configured for input of a name of the classification field to be created. By way of example, the user has entered the name "Age Classification" for the classification field. The panel 1110 further includes a definition input area 1130 including a plurality of graphical elements.

The definition input area 1130 allows for user specification of one or more classification categories (also referred to as groups). In one embodiment, the user can click on a pushbutton "Add Group" 1140 to create a new category. Illustratively, the user has created four categories 1152-1158 including a default category 1158. To create a category, the user selects an operator using a pull-down menu 1162. The user further enters a value as boundary for the category to be created into a text field 1164. Then the user clicks on the pushbutton "Add Group" 1140. For instance, to create the category 1152, the user selects an operator "<" using the pull-down menu 1162 and enters the boundary value "18" into the text field 1164. Then the user clicks on the pushbutton "Add Group" and a representation 1168 including the selected operator "<", the selected boundary value "18" and a text field 1170 is displayed in the definition input area 1130. Then the user enters a category name into the text field 1170. Illustratively, the user entered "Child" as category name. Accordingly, the category name "Child" is returned upon execution of an abstract query including the "Age Classification" field for each result value from the "Age" result field that is less than "18".

The definition input area 1130 further includes a list of checkboxes 1180, one for each specified category. The checkboxes allow the user to select categories for use with the "Age Classification" field. Furthermore, using a pushbutton "Delete" 1160, a selected category can be removed from the classification definition.

Upon completion of the specification of the definition of the "Age Classification" field, the user can click on a pushbutton "OK" 1182 to initiate creation of the "Age Classification" field using the result field "Age" and the specified classification definition. Furthermore, the user can click on a pushbutton "Save" 1186 to initiate creation and storage of a classification field data object for the "Age Classification" field. In this way, the classification field data object can be stored persistently and subsequently retrieved for use in the same or a different query. However, if the user does not want to use the specified classification definition, the user may click on a pushbutton "Cancel" 1184. Processing then returns to display of the panel 910 of FIG. 9 as illustrated in FIG. 12.

Referring now to FIG. 12, the panel 910 of the illustrative GUI screen 800 of FIG. 9 is shown after specification of the "Gender Classification" and "Age Classification" fields according to FIGS. 10-11. Illustratively, the panel 910 includes a text display area 1232. The text display area 1232 corresponds to the text display area 932 of FIG. 9 which further includes a list 1238 of indications of the "Gender Classification" field and the "Age Classification" field which have been created for the "Gender" and "Age" result fields, respectively. Each classification field indication in the list 1238 has an associated checkbox to allow selection of the classification fields for further processing. For instance, a checkbox 1246 can be clicked to select the "Age Classification" field for further processing. Further processing can be initiated as described above with reference to FIG. 9, for instance by clicking the pushbutton "Classification" 940 of FIG. 9.

In the following, abstract classification fields and use of the abstract classification fields in execution of an abstract query are described in more detail for illustration. By way of example, the following exemplary abstract classification fields of Table VII can be created at step 760 of method 700 on the basis of the example described above with reference to FIGS. 10 and 11.

TABLE VII

ABSTRACT GENDER AND AGE CLASSIFICATION FIELDS

```
001    <?xml version="1.0"?>
002    <QueryAbstraction>
003      <Selection>
004      </Selection>
005      <Results format="HTML" blockSize="25" distinct="Yes" mode="Detail" >
006        <Field name="data://Demographic/Patient ID" fieldType="int" />
007        <Field name="data://Demographic/Gender" fieldType="char" />
008        <Field name="data://Demographic/Birth and Age/Age" fieldType="int" />
009        <Field name="data://Demographic/Gender" fieldType="char"
010             label="Gender Classification">
011          <SplitInfo name="Gender Classification">
012            <SplitData name="The Girls" >
013               <SplitValue>Female</SplitValue>
014            </SplitData>
015            <SplitData name="The Boys" >
016               <SplitValue>Male</SplitValue>
017            </SplitData>
018            <SplitData name="Unclassified" >
019               <Operator>Default</Operator>
020               <Value></Value>
021            </SplitData>
022          </SplitInfo>
023        </Field>
024        <Field name="data://Demographic/Birth and Age/Age" fieldType="int"
025             label="Age Classification">
026          <SplitInfo name="Age Classification">
027            <SplitData name="Child" >
028               <Operator>LT</Operator>
029               <Value>18</Value>
030            </SplitData>
031            <SplitData name="Young Adult" >
032               <Operator>LT</Operator>
033               <Value>40</Value>
034            </SplitData>
035            <SplitData name="Adult" >
036               <Operator>LT</Operator>
037               <Value>60</Value>
038            </SplitData>
039            <SplitData name="Senior" >
040               <Operator>Default</Operator>
041               <Value></Value>
042            </SplitData>
043          </SplitInfo>
044        </Field>
045      </Results>
046      <EntityRef name="Patient ID"/>
047    </QueryAbstraction>
```

In the example of Table VII, lines 009-023 correspond to the "Gender Classification" field which has been created as described above with reference to FIG. 10. By way of example, lines 012-014 of Table VII correspond to the classification category which has been created to classify individuals having the gender "Female" into a classification category "The Girls". Similarly, lines 024-044 of Table VII correspond to the "Age Classification" field which has been created as described above with reference to FIG. 11.

The classification fields of Table VII can be used in an abstract query. For instance, the classification fields of Table VII can be used in the abstract base query of Table III to create an abstract classification query, as illustrated in Table VIII. By way of illustration, the exemplary abstract classification query is defined using XML. However, any other language may be used to advantage.

TABLE VIII

ABSTRACT CLASSIFICATION QUERY EXAMPLE

```
001    <?xml version="1.0"?>
002    <QueryAbstraction>
003      <Selection>
004        <Condition field="Citizenship" operator="EQ"
                value="American"/>
005      </Selection>
006      <Results>
007        <Field name="PatientID"/>
008        <Field name="Gender Classification"/>
009        <Field name="Age Classification"/>
010      </Results>
011    </QueryAbstraction>
```

The abstract classification query of Table VIII corresponds to the abstract base query of Table III, wherein the "Gender" result field (line 008 of Table III) has been replaced by the "Gender Classification" field for purposes of illustration. Furthermore, the "Age" result field (line 009 of Table III) has been replaced by the "Age Classification" field. The exemplary abstract classification query can be transformed into a concrete classification query (that is, a query consistent with the underlying physical data to be queried) shown in Table IX below. By way of illustration, the exemplary concrete classification query is defined using SQL. However, any other language may be used to advantage.

TABLE IX

EXEMPLARY CONCRETE SQL CLASSIFICATION QUERY

| | |
|---|---|
| 001 | SELECT PID as "PatientID", Gender, Age |
| 002 | CASE Gender |
| 003 | WHEN 'F' THEN 'The Girls' |
| 004 | WHEN 'M' THEN 'The Boys |
| 005 | ELSE 'Unclassified' |
| 006 | AS "Gender Classification" |
| 007 | CASE WHEN Age < 18 THEN 'Child' |
| 008 | WHEN Age < 40 THEN 'Young Adult' |
| 009 | WHEN Age < 60 THEN 'Adult' |
| 010 | ELSE 'Senior' |
| 011 | AS "Age Classification" |
| 012 | FROM PatientInfo |
| 013 | WHERE Citizenship='American' |

As can be seen from lines 002-011, the exemplary concrete SQL classification query includes two CASE clauses: a first CASE clause for the "Gender Classification" field (lines 002-006) and a second CASE clause for the "Age Classification" field (lines 007-011). By way of example, the first CASE clause specifies: (i) in line 003 the classification category defined in lines 012-014 of Table VII, (ii) in line 004 the classification category defined in lines 015-017 of Table VII, and (iii) in line 005 the default classification category defined in lines 018-021 of Table VII. The second CASE clause similarly corresponds to the Age classification categories of Table VII.

Upon execution of the exemplary concrete SQL classification query of Table IX against the exemplary database table illustrated in Table V, the result table illustrated in Table X below is returned.

TABLE X

EXEMPLARY CLASSIFICATION QUERY RESULTS

| 001 | Patient_ID | Age | Gender |
|---|---|---|---|
| 002 | 1 | Adult | The Boys |
| 003 | 2 | Child | The Girls |
| 004 | 4 | Child | The Girls |
| 005 | 8 | Young Adult | The Boys |
| 006 | 11 | Adult | The Girls |
| 007 | 12 | Senior | The Girls |
| 008 | 13 | Young Adult | The Boys |

Compared to the query results of Table VI, the query results of Table X include classified information with respect to the "Gender" and "Age" result fields. For example, the "Gender" result field includes as values "The Boys" and "The Girls."

It should be noted that the foregoing may refer to specific user interfaces and graphical elements, such as windows, pushbuttons, checkboxes, pull-down menus and text boxes. However, any user interface elements or graphical elements of corresponding user interfaces, such as icons, pop-up menus, or list boxes, may be used to implement user interfaces suitable for creation of abstract classification fields and queries. Thus, references to such specific user interface elements or graphical elements are merely for purposes of illustration and not limiting of the invention.

While the foregoing is directed to embodiments of the present invention, other and further embodiments of the invention may be devised without departing from the basic scope thereof, and the scope thereof is determined by the claims that follow.

What is claimed is:

1. A computer-implemented method of constructing an abstract classification field, comprising:
receiving user input specifying a logical field corresponding to a logical field specification of a data abstraction model;
receiving user input specifying a classification definition for the logical field;
generating the abstract classification field on the basis of the logical field and the classification definition;
wherein the data abstraction model describes data in the database independently from a schema of the database, and exposes information as a set of logical fields used to compose abstract queries, wherein the logical field is associated with a specific set of data in the database, and is used to describe the specific set of data, wherein the abstract classification field is associated with the specific set of data in the database and is configured for determining classified information related to the specific set of data, and wherein the classification definition specifies a rule for dividing the specific set of data into a plurality of categories.

2. The method of claim 1, further comprising displaying the generated classification field for user-selection.

3. The method of claim 1, further comprising:
generating a data object including the classification field; and
storing the data object persistently.

4. The method of claim 1, further comprising:
associating the classification field with an abstract query comprising one or more result fields for data returned from the database in a set of query results, each result field corresponding to a logical field specification of the data abstraction model.

5. The method of claim 4, further comprising:
transforming the abstract query into an executable query for execution against the data in the database.

6. The method of claim 5, wherein the executable query is an SQL query.

7. The method of claim 1, further comprising:
receiving user input specifying an abstract query comprising one or more result fields for data returned from the database in a set of query results, each result field corresponding to a logical field specification of the data abstraction model.

8. The method of claim 7, further comprising:
receiving a user selection to perform the abstract query using the classification field;
including the classification field with the abstract query; and
generating an executable query on the basis of the abstract query and the included classification field.

9. The method of claim 7 further comprising:
generating a data object comprising the abstract query and the classification field.

10. The method of claim 1, further comprising:
displaying a user interface allowing user specification of the logical field and the classification definition.

11. A computer-readable storage medium containing a program which, when executed by a processor, performs a process of constructing an abstract classification field, the process comprising:
receiving user input specifying a logical field corresponding to a logical field specification of a data abstraction model;
receiving user input specifying a classification definition for the logical field;

generating the abstract classification field on the basis of the logical field and the classification definition;

wherein the data abstraction model describes data in the database independently from a schema of the database, and exposes information as a set of logical fields used to compose abstract queries, wherein the logical field is associated with a specific set of data in the database, and is used to describe the specific set of data, wherein the abstract classification field is associated with the specific set of data in the database and is configured for determining classified information related to the specific set of data, and wherein the classification definition specifies a rule for dividing the specific set of data into a plurality of categories.

12. The computer-readable storage medium of claim 11, wherein the process further comprises:

generating a data object including the classification field; and storing the data object persistently.

13. The computer-readable storage medium of claim 11, wherein the process further comprises:

associating the classification field with an abstract query comprising one or more result fields for data returned from the database in a set of query results, each result field corresponding to a logical field specification of the data abstraction model.

14. The computer-readable storage medium of claim 13, wherein the process further comprises:

transforming the abstract query into an executable query for execution against the data in the database.

15. The computer-readable storage medium of claim 14, wherein the executable query is an SQL query.

16. The computer-readable storage medium of claim 11, wherein the process further comprises:

receiving user input specifying an abstract query comprising one or more result fields for data returned from the database in a set of query results, each result field corresponding to a logical field specification of the data abstraction model.

17. The computer-readable storage medium of claim 16, wherein the process further comprises:

receiving a user selection to perform the abstract query using the classification field;

including the classification field with the abstract query; and generating an executable query on the basis of the abstract query and the included classification field.

18. The computer-readable storage medium of claim 16, wherein the process further comprises:

generating a data object comprising the abstract query and the classification field.

19. The computer-readable storage medium of claim 11, wherein the process further comprises:

displaying a user interface allowing user specification of the logical field and the classification definition.

20. A system, comprising:

a processor; and a memory storing a program, which, when executed on the processor, performs an operation for constructing an abstract classification field, the operation comprising:

receiving user input specifying a logical field corresponding to a logical field specification of a data abstraction model;

receiving user input specifying a classification definition for the logical field;

generating the abstract classification field on the basis of the logical field and the classification definition, wherein the data abstraction model describes data in the database independently from a schema of the database, and exposes information as a set of logical fields used to compose abstract queries, wherein the logical field is associated with a specific set of data in the database, and is used to describe the specific set of data, wherein the abstract classification field is associated with the specific set of data in the database, and is configured for determining classified information related to the specific set of data, and wherein the classification definition specifies a rule for dividing the specific set of data into a plurality of categories.

* * * * *